(Model.)
G. WORK.
WASHING MACHINE.
No. 244,706.  Patented July 19, 1881.
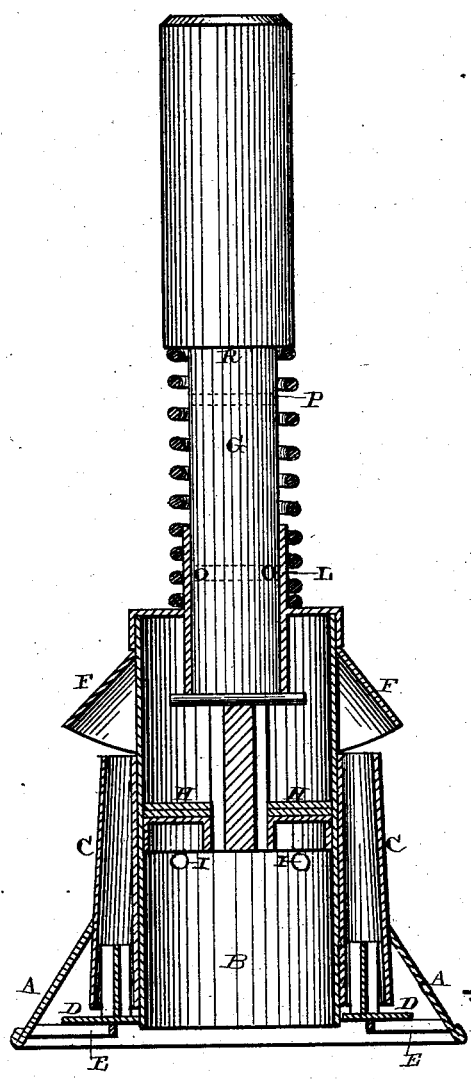
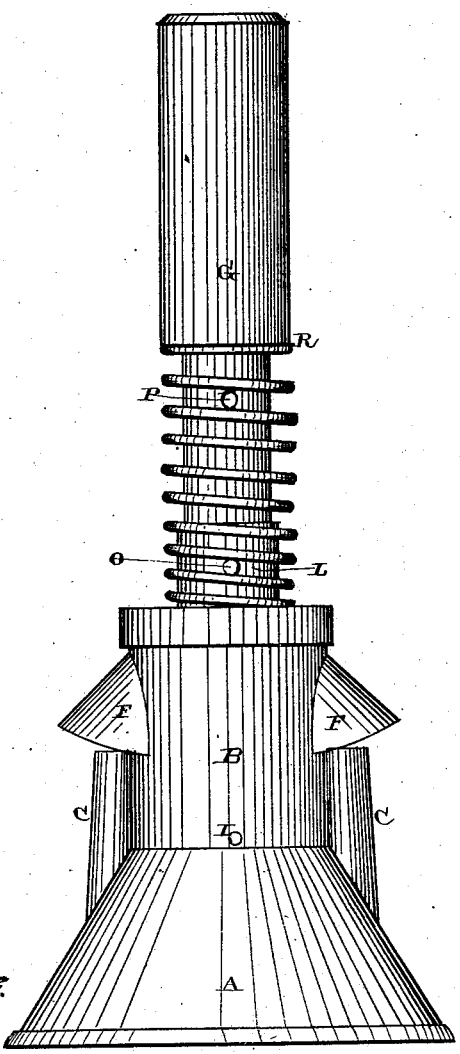
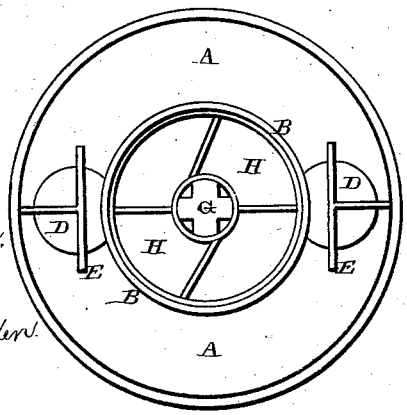
Witnesses.
W. W. Mortimer.
A. C. Kuskadden.
Inventor.
Gardner Work,
per
F. A. Lehmann,
Atty.

UNITED STATES PATENT OFFICE.

GARDNER WORK, OF ANGOLA, INDIANA, ASSIGNOR OF ONE-HALF TO CLARENCE W. SLOCUM, OF SAME PLACE.

WASHING-MACHINE.

SPECIFICATION forming part of Letters Patent No. 244,706, dated July 19, 1881.

Application filed May 23, 1881. (Model.)

*To all whom it may concern:*

Be it known that I, GARDNER WORK, of Angola, in the county of Steuben and State of Indiana, have invented certain new and useful Improvements in Washing-Machines; and I do hereby declare the following to be a full, clear, and exact description of the invention, such as will enable others skilled in the art to which it pertains to make and use it, reference being had to the accompanying drawings, which form part of this specification.

My invention relates to an improvement in atmospheric clothes-washers; and it consists in the combination of a central chamber in which the plunger moves and an outer chamber which is provided with air tubes and valves, as will be more fully described hereinafter.

The object of my invention is to provide a machine which will thoroughly cleanse the clothes without the slightest injury to them and with very little exertion of the operator.

Figure 1 is a vertical section of my invention. Fig. 2 is a side elevation of the same. Fig. 3 is an inverted view.

A represents the lower and outer chamber of the washer, and which is secured at its upper edge to the vertical chamber B, which extends downward, so that its lower edge is nearly on a line with the lower edge of the chamber A. Passing down through its top, upon opposite sides, are the air-tubes C, and placed just below the lower ends of these tubes are the valves D. These valves D are held in position by means of suitable guides and supports, E, which allow the valves to sink down below the ends of the tube sufficiently far for air to pass freely into the chamber A when it is raised. The downward movement of the pounder causes these valves to rise upward against the lower ends of the tube, and thus prevent the escape of the air through them.

Secured to the sides of the vertical chamber, above the tops of the tubes, are the shields or guards F, which prevent the water from being splashed outward over the operator. Through the top of the vertical chamber B is made a suitable opening for the lower end of the handle G to play back and forth in, and secured to the lower end of this handle is the plunger H, which is packed so as to move air-tight. The under side of this plunger is divided into chambers, as shown in Figs. 1 and 3, so as to keep a certain amount of air in them, which will not be affected by the grooves made in the sides of the lower end of the handle. A small quantity of air escapes through the chamber B at the center of the plunger; but with this exception the plunger moves air-tight. When the handle is depressed a portion of the air contained in the lower part of the chamber B is forced downward into the chamber A, and as the plunger passes the air-hole I the air passes into the top of the chamber, together with that which passes through the grooves in the end of the handle, so as to prevent a vacuum from being formed. As the plunger rises upward a portion of the air which passed into the top of the chamber is forced out through its top around the handle, while the other portion passes downward through the grooves in the end of the handle.

Upon the top of the chamber B is formed an extension, L, which serves as a guide to keep the handle straight in its movements, and through which is made a hole, O, which registers with the hole P made through the handle just below the shoulder R, against which the spring bears when the handle is forced downward to its full length. When a pin is passed through the holes made in both the extension and the handle, the handle and the washer upon its lower end are secured rigidly together, so that the handle has no vertical play. In this position the plunger is secured rigidly in place in the bottom of the chamber B, and the washer may be used like the ordinary atmospheric pounder which has no piston placed in it. The lower end of this piston is divided into a series of chambers, as shown.

When it is desired to remove the piston for the purpose of cleaning the washer it is only necessary to turn the top of the chamber B partially around and move it upward, when the plunger can be entirely removed.

In order to prevent the upward movement of the plunger in the chamber B from causing a vacuum in the lower portion of the chamber, and thus drawing up both water and clothes into the lower end of the chamber, the lower end of the handle has a number of notches or grooves cut in its side, and the grooves or notches extend entirely through the plunger, so that the air, which is admitted into the top of the chamber B through the air-holes I, can pass freely down into the chamber when the plunger rises upward. When the plunger is removed from the top of the chamber B the cover is prevented from being forced entirely off the lower end of the handle by means of the pin which passes horizontally through it, against which it is forced by means of a spiral spring.

When the handle is left free to move it will be seen that my machine, when forced downward upon the clothes, forces a volume of air from the central chamber, B, which is compressed in the outer chamber, A, thus causing a more direct and positive action of the air than would be caused if the cone alone were used.

When it is desired to use the chamber without the assistance of the plunger it is only necessary to lock the plunger in position, as above described.

Having thus described my invention, I claim—

1. The combination of the chamber B, the plunger moving therein, the handle, the spring, the extension formed upon the top of the chamber, and a pin for passing through both extension and handle, whereby the plunger may be locked in position in the lower part of the chamber, substantially as described.

2. The combination of the handle, the pin secured to its lower end, and piston, the handle being grooved so that the air can pass from the top of the chamber through the plunger, substantially as set forth.

3. In an atmospheric washer, the combination of the chamber A, provided with the air-tube C, the valves D, with the vertical chamber B, provided with the air-holes I, and a vertically-moving plunger, which is operated by a handle, the handle being grooved at its lower end so as to allow the air to pass back and forth between the upper and lower portions of the chamber, substantially as specified.

In testimony whereof I affix my signature in presence of two witnesses.

GARDNER WORK.

Witnesses:
 BYRON WORK,
 RINALDO REID.